2,943,063
CATALYSTS FOR POLYMERIZATION OF OLEFINS

Lawrence T. Eby, Linden, Charles W. Seelbach, Cranford, Delmer L. Cottle, Highland Park, and Robert M. Thomas, Westfield, N.J., assignors to Esso Research and Engineering Company, a corporation of Delaware No Drawing. Filed Nov. 30, 1955, Ser. No. 550,167

3 Claims. (Cl. 252—429)

The present invention relates to the polymerization of olefins and to catalysts therefor. More particularly, the invention pertains to the polymerization of olefins at relatively low pressures for the production of olefin polymers of high molecular weight and to the preparation of catalysts therefor.

In one of its aspects, the invention involves the polymerization of olefins such as ethylene to polymers such as polyethylene of high molecular weight, at relatively low pressures in the presence of catalyst compositions obtained by reacting a reducing metal-containing material with a reducible heavy metal compound and activating the catalysts in a new method of preparation. This new method of preparation, which in itself is an important aspect of the invention, has for its principal feature the activation of inactive or low activity compositions of this type by a treatment of such compositions with additional reducing metal-containing materials, particularly alkyl aluminum compounds.

Prior to the present invention it has been found that ethylene and other olefins may be polymerized at relatively low pressures not substantially exceeding atmospheric pressure when using various combinations of aluminum compounds, such as aluminum hydride, aluminum alkyls, e.g. trialkyls, alkyl aluminum halides, etc., with various reducible heavy metal compounds, such as the halides, acetyl acetonates, etc., of the metals of groups IV–VI and VIII of the periodic system, e.g. of titanium, zirconium and iron. Among the most active types of catalysts for this reaction are combinations of trialkyl aluminum or dialkyl aluminum halide with titanium tetrahalide. More specifically, excellent results have been obtained when using combinations of triethyl aluminum or di-ethyl aluminum chloride with titanium tetrachloride, obtained by simply mixing the catalyst components at atmospheric temperature in suitable solvents. These catalysts have been found to afford high yields of good quality, high molecular weight, solid high softening point polymers of ethylene and other olefins even at pressures as low as, or closely approaching, atmospheric pressure. For example, catalyst efficiencies up to 200 g., and more, of polymer per gram of catalyst have been attained with ethylene.

However, catalysts prepared in this manner are extremely sensitive to aging and storage conditions. They lose their activity upon storage of only a few hours even at room temperature. Therefore, it has been necessary heretofore to employ these catalysts forthwith upon their preparation. Also, the activity of these catalysts depends, to a considerable degree, on a careful control of the conditions of mixing time, temperature and concentration employed during catalyst preparation. These conditions determine the degree of reduction of titanium or other heavy metal, which in turn is believed to determine catalyst activity. Slight variations in these conditions may lead to a considerable reduction or even complete loss of catalyst activity.

It has also been attempted to arrive at a more readily reproducible and more stable catalyst by isolating what is believed to be its essential active ingredient, i.e. the solid precipitate containing the reduced heavy metal component, formed by mixing the catalyst components. However, this precipitate itself has been found to be of little, if any, polymerizing activity and, as such, unsuitable for the preparation of stable catalyst stock of consistent activity. The present invention overcomes, or at least greatly alleviates, the difficulties mentioned above.

It has now been found that inactive or low-activity olefin polymerization catalysts obtained by reacting a metal or metal compound having reducing activity with a reducible heavy metal compound may be activated by treating the finished composition of low activity with additional amounts of a reducing metal material, particularly an alkyl aluminum compound. The activating compound may be used in proportions of about 0.1–10 grams per gram of solid, preferably about 0.5–3 grams per gram of solid. Activating conditions include slurrying the solid component with the activating agent at temperatures from below room temperature to 150° C. Hydrocarbons may be used as diluents for the activators. The activation may be carried out under pressure. The invention has particular utility for the activation of catalysts of the type referred to, which are of low activity prior to their use in the polymerization reaction proper.

While believed to be applicable to a wide variety of catalyst composites within the scope just specified, the invention finds its greatest utility in the activation of catalyst composites obtained by the reaction of alkyl aluminum compounds with the halides of titanium or zirconium, particularly titanium tetrachloride. Activation in accordance with the present invention may be applied to catalyst composites whose activity is low as the result of extended storage; to catalyst composites which have been prepared at unfavorable mixing conditions, particularly at unfavorable temperatures; and to the isolated low activity solid precipitate obtained by mixing titanium tetrachloride or its equivalent with an alkyl aluminum compound.

In general, any of the alkyl aluminum compounds which have utility as the reducing component of the catalyst composites here involved may be used for catalyst activation in accordance with the present invention. It is however a particular advantage of this invention that such alkyl aluminum compounds which, due to their relatively weak reducing activity, yield catalysts of little, if any, polymerization activity when reacted with titanium tetrachloride or its equivalent may be used with excellent results for the activation in accordance with the present invention. For example, methyl and ethyl aluminum dichlorides, as well as dimethyl aluminum chloride and trimethyl aluminum have heretofore found little, if any, application as components of active polymerization catalysts. The present invention permits the use of these materials in a highly efficient manner.

In accordance with one embodiment of the invention a brown solid is prepared by mixing anhydrous, oxygen-free, hydrocarbon solutions of titanium tetrachloride and/or its equivalent, a strongly reducing alkyl aluminum compound, such as triethyl aluminum or diethyl aluminum chloride in the absence of oxygen and other reactive bases. This catalyst mixture is active for the polymerization of ethylene and other olefins even at atmospheric conditions to high molecular weight products. However, it loses its activity when stored at room temperature or when it is warmed to 40°–80° C. It is completely inactive after storage at room temperature for a few days. Polymerization activity may be restored by the addition of solutions of such alkyl aluminum compounds of relatively weak reducing activity as ethyl aluminum dichloride, methyl aluminum dichloride, dimethyl aluminum chloride, or trimethyl aluminum in an inert solvent like n-heptane at −40° C. to above room temperature. Pressures above atmospheric pressure may be used particularly to maintain a liquid phase if low boiling hydrocarbon diluents are used. Of course, this embodiment of the invention may be applied not only to the restoration of polymerization activity but also to the enhancing of the catalytic activity of active but weakened catalysts by the addition of solutions of the alkyl aluminum compounds mentioned to the catalyst mixtures obtained from titanium tetrachloride and triethyl aluminum or diethyl aluminum chloride, or the like before they have lost their activity.

In accordance with another embodiment of this invention, stable catalyst stock may be prepared which may be used in batch or continuous polymerization of ethylene and other olefins. The brown solid which is obtained from titanium tetrachloride or its equivalent and triethyl aluminum or diethyl aluminum chloride or their equivalents as described above is separated preferably by filtration in an inert atmosphere. The mother liquor is removed by washing with an inert solvent, preferably a saturated hydrocarbon, the solid is reslurried in an inert solvent like n-heptane, and stored in the absence of moisture, oxygen and other reactive gases. This mixture is inactive or only slightly active for the polymerization of olefins. The activity depends somewhat on how well it was washed and how long it was stored before and after it was filtered, as well as whether it was prepared from triethyl aluminum or diethyl aluminum chloride. This brown solid may be stored in the inert solvent indefinitely without affecting its utility for this embodiment of the invention. When needed as catalyst for olefin polymerization, this stable slurry of brown solid is added to the polymerization vessel with the addition of a solution of methyl or ethyl aluminum dichloride, dimethyl aluminum chloride, trimethyl aluminum or other alkyl aluminum compound. The resulting mixture is active as a catalyst for the polymerization of ethylene and other olefins.

For a batch polymerization the stable slurry of brown solid may be added first and all or part of the activating alkyl aluminum compound is added just before or during the introduction of the olefin. The solution of activating alkyl aluminum compound may also be added during the polymerization until no more polymerization takes place. For a continuous process the stable slurry of brown solid may be premixed with the activating alkyl aluminum compound or the two components may be added with the aid of diluents in separate streams simultaneously to the polymerization vessel.

As previously mentioned, for an optimum catalyst mixture from titanium tetrachloride or its equivalents and alkyl aluminum compounds, it is necessary carefully to control the temperature and time of contact of these ingredients after they are mixed and prior to the polymerization of ethylene. The detrimental effects of undesirable variations in these conditions may be greatly minimized by the present invention. For this purpose only part of the aluminum compound is mixed with the titanium tetrachloride or equivalent and this is allowed to react to give the maximum yield of brown solid, i.e. maximum reduction. Higher temperatures and longer times than heretofore can be used without detrimental end effects and the mixture may be stored longer. This slurry may be treated in accordance with the invention or the brown solid may be separated and mixed with an inert solvent like n-heptane before it is added to the polymerization vessel. The separated solid is more stable on storage if it is filtered and stored in the inert solvent. At the time of polymerization, the remaining or additional amount of alkyl aluminum compound is added to obtain an active catalyst. The alkyl aluminum compound added at the time of polymerization may either be the same as or different from that originally used. More particularly, alkyl aluminum compounds of lower reducing activity than those originally used may be employed at this stage, for example, ethyl or methyl aluminum dichloride, dimethyl aluminum chloride, trimethyl aluminum, etc.

This embodiment of the invention provides a much more flexible and easily controlled method of catalyst preparation, as well as a more active catalyst system, than when all of the aluminum compound is mixed at once with the titanium tetrachloride. It is also interesting to note that there is no advantage in adding originally only part of the titanium tetrachloride to the triethyl aluminum or diethyl aluminum chloride. Furthermore, operation in accordance with the present invention leads to substantially increased molecular weights of the product polymer.

In all embodiments of the invention the polymerization may be run batchwise by feeding the inactivated catalyst slurry containing the brown solid to the polymerization vessel and adding all or part of the solution of activating alkyl aluminum compound to the vessel just before or during the introduction of the olefin, such as ethylene. A solution of activating alkyl aluminum compound may also be added during the polymerization until no more polymerization takes place.

The polymerization may also be carried out as a continuous process. In this case, the unreactivated catalyst mixture containing the brown solid and the solution of activating alkyl aluminum compound may be premixed before addition to the polymerization vessel or they may be added as separate streams. There is no detrimental effect connected with adding separate streams in accordance with the present invention as it is known to be the case when a solution of titanium tetrachloride and a solution of triethyl aluminum or diethyl aluminum chloride are added separately to the polymerization reactor as the original catalyst ingredients.

In all other respects, catalyst composition and preparation as well as polymerization conditions may be those heretofore used in the specific art of low pressure olefin polymerization. Thus, a list of reducing catalyst components of outstanding utility includes the following aluminum compounds: tri-n-octyl aluminum, tri-isobutyl aluminum, tripropyl aluminum and triethyl aluminum, and dialkyl aluminum halides, such as diethyl aluminum halides. Suitable aluminum compounds of somewhat lower reducing activity which are also useful as activating agents in accordance with the present invention include the following: dimethyl aluminum halides, trimethyl aluminum, methyl and ethyl aluminum dihalides, higher dialkyl aluminum halides and trialkyl aluminum compounds having alkyl groups higher than about $C_{10}$. Mixtures of aluminum alkyls can also be used. For example, mixtures containing ethyl aluminum dichloride and diethyl aluminum chloride have been successfully used to produce active catalysts in this manner. Similarly, mixtures of ethyl aluminum dichloride and triethyl aluminum or of diethyl aluminum chloride and triethyl aluminum can be used. All these compounds as well as methods for their preparation are well known in the art. Quite generally, in addition to trialkyl or aryl aluminum compounds, organo-aluminum compounds carrying two hydrocarbon radicals or at least one hydrocarbon radical and one hydrogen, as well as an electron attracting group, such as an alkoxy, halogen, organic nitrogen or sulfur radical, etc., may be used.

Other suitable reducing materials which may be used to prepare the unreactivated catalyst composite include the alkali and alkaline earth metals, their alloys, hydrides and their alkyl and/or aryl compounds, as well as quite generally the alkyl and aryl derivatives of other metals which have sufficient stability to permit reaction in their compound form with a reducible heavy metal compound.

Heavy metal compounds suitable for the purposes of the invention include such inorganic compounds as the halides, oxy-halides, complex halides, oxides, hydroxides, and organic compounds such as alcoholates, acetates, benzoates and acetyl acetonates of the transition metals of the IV, V, VI and VII periods of the periodic system, e.g. titanium, zirconium, hafnium, thorium, uranium, vanadium, niobium, tantalum, chromium, molybdenum, tungsten and manganese, as well as iron and copper. The metal halides, particularly the chlorides, are generally preferred, titanium and zirconium being the most active of these metals. The following heavy metal compounds are relatively readily reducible titanium tetrabromide, titanium tetrachloride and zirconium acetylacetonate. The relatively difficultly reducible compounds include ferrous chloride, chromic chloride and manganese chloride.

Particularly striking results have been obtained by applying the present invention to ethylene polymerization carried out with catalysts prepared by reacting triethyl aluminum, diethyl aluminum chloride or mixtures of diethyl aluminum chloride with triethyl aluminum as the reducing agent with titanium tetrachloride as the heavy metal component.

The original catalyst composites are quite generally prepared by intimately mixing the aluminum compound or other reducing component and the heavy metal compound preferably in a solvent or diluent and in a non-oxidizing atmosphere while stirring. Paraffinic hydrocarbons, such as heptane or other saturated petroleum or synthetic hydrocarbon oils, are the most suitable solvents for this purpose as well as for the application of the activating compounds of the invention.

The molar ratio of the aluminum compound to the heavy metal compound in the original as well as the activated final catalyst mixture may vary widely. In general, the higher the polymer molecular weight desired the higher should be this ratio. A preferred molar ratio for alkyl aluminum compounds to titanium tetrachloride for making polymers above 20,000 molecular weight is about 1–12:1, molar ratios of 1–6:1 and even substantially equimolar proportions, based on metal, being suitable in many cases.

The polymerization process employing the catalysts prepared in accordance with the invention is carried out at conditions normally used heretofore in the low pressure polymerization of olefins to prepare high molecular weight polymers suitable as "plastics" and for similar purposes. These conditions depend somewhat on the specific olefin involved and on the type of polymer desired. Ethylene is the preferred olefin although higher olefins, such as propylene, butylenes, styrene, hexadecene, butadiene, etc., may be used alone or in mixtures. The polymers produced have molecular weights above 2000 and may range as high as from 300,000–3,000,000 and more as determined by the intrinsic viscosity method using the I. Harris correlation (J. Polymer Science, 8, 361 (1952)). In the case of ethylene, the polymerization is carried out by intimately contacting gaseous ethylene with the catalyst of the invention, for example by bubbling the ethylene into a suspension of the catalyst in an inert solvent or diluent. Neither the polymerization temperature nor the polymerization pressure is particularly critical. It is preferred, however, to operate at temperatures of about 0°–150° C., such as 25°–90° C.

Pressures ranging anywhere from atmospheric or subatmospheric to 250 atmospheres have been used heretofore in the low pressure polymerization of ethylene and other olefins on catalysts of the type improved by the present invention. Similar pressures may be used for the process of the invention.

The reaction is preferably carried out under careful exclusion of oxygen while stirring in batch or continuous operation. When operating batchwise, olefin introduction is continued until the catalyst is exhausted and the reaction ceases. In order to permit stirring even after the formation of substantial amounts of solid polymer solvents or diluents may be used. These diluents which should be liquid at the operating conditions include aliphatic, hydroaromatic and aromatic hydrocarbons, such as pentane, hexane, higher paraffins, cyclohexane, tetrahydronaphthalene, decahydronaphthalene, benzene, xylene, halogenated aromatic hydrocarbons, e.g. mono- or di-chlorobenzenes and mixtures thereof. The polymer concentration in the reaction mixture may be about 10–40%.

The amount of catalyst used may vary within wide limits depending somewhat on the purity of the olefin feed. Proportions of as little as 0.1 part by weight of catalyst per 1,000 parts by weight of olefin are sufficient if the feed is pure. With olefin feed streams containing about 0.01% of water, oxygen, carbon dioxide or certain other oxygenated compounds, catalyst proportions of about 0.5–5 wt. percent are usually adequate.

Upon completion of the polymerization reaction, the catalyst is completely deactivated, e.g. by the addition of an alcohol, such as isopropyl alcohol or n-butyl alcohol in amounts of about 10–100 times the amount of catalyst used. The reaction slurry may then be filtered, the filter cake reslurried in a catalyst solvent, such as dry, concentrated alcohol at about 50°–100° C. for 15–60 minutes, filtered again and the filter cake dried, preferably under reduced pressure. Ash residues in the polymer are reduced below about 0.05% by this procedure.

The polymers produced by the present invention are at least equal in quality and, in many cases superior to, those produced by conventional low pressure polymerization processes. This and other more specific aspects of the invention will be best understood by reference to the following specific examples.

*Example I*

Five ml. of a 0.843 molar solution of titanium tetrachloride in n-heptane and 11.1 ml. of a 0.790 molar solution of ethyl aluminum dichloride in n-heptane were added to a dropping funnel containing 50 ml. of dry n-heptane. More dry n-heptane was added to make the total volume up to 250 ml. This very light yellow solution was transferred to a Pyrex glass polymerization vessel, being protected at all times with an atmosphere of dry nitrogen. The stirred mixture was heated to 50° C. and held at this temperature for 49 minutes and then cooled to 27° C. with an ice bath. No precipitate was formed but a few droplets of viscous yellow oil deposited on the sides of the vessel. Purified dry ethylene was introduced into the stirred liquid at a rate of 500 ml./min. with no absorption nor evidence of polymer formation at room temperature (25°–27° C.) for 30 minutes, then heated to 80° C. for 15 minutes, allowed to cool to 29° C. and again heated to 80° C. and held there for 15 minutes. The total time of introducing ethylene at 500 ml./min. was 2 hrs. and 55 minutes after which 50 ml. of isopropanol was added to decompose the catalyst. A clear colorless solution resulted with no evidence of polymer.

This experiment shows that ethyl aluminum dichloride does not react with $TiCl_4$ to form an active polymerization catalyst.

In another experiment 5 ml. of a 0.843 molar solution of titanium tetrachloride in n-heptane and 0.876 molar solution of ethyl aluminum compound (87% triethyl aluminum—13% diethyl aluminum bromide) in n-heptane were added to 50 ml. of dry n-heptane in a dropping funnel. A brown precipitate formed immediately. More dry n-heptane was immediately added to make the total volume of the mixture up to 100 ml. After standing for an hour at room temperature the mixture was filtered in a dry nitrogen atmosphere. The brown solid was reslurried in dry n-heptane and refiltered twice. The brown solid was then reslurried in 250 ml. of n-heptane and transferred to the Pyrex glass polymerization vessel. Pure dry ethylene was bubbled into the stirred mixture at a rate of 500 ml./min. for 9 minutes during which time the temperature increased from 24.2°–32.8° C. The ethylene ratio was increased to 1,000 ml./min. and the temperature reached a maximum of 40.0° and then decreased to 35.4° C. with a total ethylene absorption to this time (31 min.) of about 7,500 ml. of ethylene. At this time addition was commenced of a 250 ml. n-heptane solution containing 11.1 ml. of a 0.790 molar solution of ethyl aluminum dichloride. This was added in 50 ml. portions to maintain ethylene absorption rates between 500 and 1,000 ml./min. at 32, 49, 61 and 108 minutes from the start of adding ethylene. The reaction temperature was maintained between 55°–60° C. by cooling with an ice bath when necessary. Finally, ethylene absorption rate decreased to less than 100 ml./min. and the temperature dropped to 32.8° C. After a total reaction time of 229 minutes, the catalyst was decomposed by adding 50 ml. of isopropanol. The white solid polymer was removed by filtration, washed with isopropanol and dried in vacuo at 70° C. The dry polymer weighed 104.2 grams. It softened at 135° C., melted between 200°–210° C., and had an intrinsic viscosity of 3.93 cm.$^3$10$^2$/g. corresponding to a molecular weight of about 235,000 by the Harris correlation (J. Poly. Science, 8, 361 (1952)) which is also used in all subsequent examples.

This experiment demonstrates that ethyl aluminum dichloride, while not an active catalyst component itself, may be used to activate the separated low activity catalyst precipitate prepared from TiCl$_4$ and an active alkyl aluminum compound.

*Example II*

Ten ml. of a 0.843 molar solution of titanium tetrachloride in n-heptane and 10 ml. of a 0.685 molar solution of dimethyl aluminum chloride in n-heptane were added to 100 ml. of dry n-heptane at room temperature (25° C.) in an atmosphere of dry nitrogen. This mixture was diluted with more dry n-heptane to bring the total volume up to 200 ml. This mixture was prepared in a dropping funnel which could be transferred to the Pyrex glass polymerization vessel without introducing air or moisture. A syrupy light yellow liquid settled to the bottom of the dropping funnel but no solid was formed. The mixture was added to the polymerization vessel which contained 500 ml. of dry n-heptane. Purified dry ethylene was bubbled into this mixture with stirring at a rate of 500 ml. of gas per minute. The temperature rose from 25.8° C. to 26.9° C. during the first 8 minutes with some polymer formation on the surface of the walls. The temperature rose to a maximum of 27.4° C. during the next 13 minutes with a little more polymer on the rod and stirrer but none in a slurry. Addition of ethylene was continued for a total of 2 hours and 35 minutes, after which 50 ml. of isopropanol was added. The polymer was removed from the walls of the vessel and from the stirrer and gas inlet tube. It was washed with isopropanol and dried in vacuo at 69° C. The total weight of polymer was 1.1 grams. The intrinsic viscosity of this polymer was 7.12 cm.$^3$10$^2$/g. as a minimum value in tetralin at 125° C. since there was still a little undissolved polymer when the viscosity was measured. This corresponds to a molecular weight of about 550,000.

The above experiment shows that the reaction of dimethyl aluminum chloride with TiCl$_4$ yields an extremely weak polymerization catalyst.

In a second experiment, 10 ml. of a 0.843 molar solution of titanium tetrachloride in n-heptane and 10 ml. of a 0.876 molar solution of ethyl aluminum compound (25% triethyl aluminum-75% diethyl aluminum chloride) in n-heptane were added to 50 ml. of dry n-heptane at room temperature in an atmosphere of dry nitrogen. A brown precipitate formed immediately. More n-heptane was added to bring the volume of the mixture up to 100 ml. The mixture was allowed to stand for two hours and then filtered in an atmosphere of dry nitrogen. The brown solid was reslurried in about 100 ml. of n-heptane and refiltered two times. The brown solid was finally reslurried in enough n-heptane to make the total volume of the mixture up to 250 ml. in a dropping funnel.

This slurry of brown solid in n-heptane was added to the Pyrex glass polymerization vessel containing 250 ml. of dry n-heptane which was blanketed with nitrogen and protected from moisture and oxygen. Purified dry ethylene was bubbled into the liquid at the rate of 1,000 ml. per minute. The temperature rose from 26.3° to 34.0° C. during the first 7 minutes with the absorption of about 3,200 ml. of ethylene gas. Only a very little polymer was noticed at this point with no more formed nor ethylene absorbed during the next 10 minutes. At this point, 50 ml. of a 0.685 molar solution of dimethyl aluminum chloride in n-heptane was added to the polymerization vessel. The ethylene began to be completely absorbed so that the rate had to be increased to 1,500 ml. per minute and the temperature rose from 33.3° to 55° C. in 3 minutes. This rate was continued for 24 minutes and then reduced to 1,000 ml. per minute as the temperature had risen to 83° C. After 7 more minutes with the temperature at 85.4° C., 250 ml. of dry n-heptane was added. About 10 minutes later there was some plugging of the ethylene inlet tube but the reaction was continued about an additional hour before 50 ml. of isopropanol was added to decompose the catalyst. The white solid polymer was removed by filtration, washed with isopropanol and dried in vacuo at 68° C. The dry polymer weighed 92.7 grams, softened at 132° C., melted at 135°–142° C., and had an intrinsic viscosity of 2.80 cm.$^3$10$^2$/g., corresponding to a molecular weight of about 145,000.

This experiment shows that dimethyl aluminum chloride, while an inactive catalyst component when reacted with TiCl$_4$ alone, is a highly effective activating agent for the stored low activity brown precipitate formed by reacting TiCl$_4$ with ethyl aluminum compound.

*Example III*

A slurry of filtered and washed brown solid in dry n-heptane was prepared in the same manner and quantity as in the second experiment of Example II except that the initial reaction mixture stood 3 hours before filtering instead of 2. This slurry was placed in the polymerization vessel with n-heptane in the same manner as in Example II and ethylene bubbled therein. There was a little more initial reaction here with the temperature spontaneously rising to 61° C. with about 17,000 ml. of ethylene gas being absorbed before the reaction was complete and no more ethylene would react. After 15 minutes of no ethylene absorption, 50 ml. of a 0.121 molar solution of methyl aluminum dichloride in n-heptane was added to the polymerization vessel. Immediately all of the 1,000 ml. per minute of ethylene being introduced was absorbed with rapid polymer formation. Another 50 ml. of a 0.121 molar solution of methyl aluminum dichloride was added after about 20 minutes. Ethylene absorption continued at least to 50% efficiency until the reaction was terminated because the gas inlet tube became plugged. The catalyst was decomposed with isopropanol (50 ml.) and the solid polymer removed by filtration, washed with isopropanol and dried in vacuo at 68° C. The dry white polymer weighed 78.1 grams, softened at 133° C., melted at 154°–187° C. and had an intrinsic viscosity of 5.04, corresponding to a molecular weight of about 336,000.

Example III demonstrates that methyl aluminum dichloride, which does not form an active catalyst with TiCl$_4$ alone, is an excellent activating agent for a low activity precipitate obtained by reacting TiCl$_4$ with an active alkyl aluminum compound and storing the separated precipitate.

*Example IV*

In a first experiment 10 ml. of a 0.843 molar solution of titanium tetrachloride in n-heptane and 10 ml. of a 0.876 molar solution of ethyl aluminum compound (87% triethyl aluminum and 13% diethyl aluminum bromide) in n-heptane were added to 50 ml. of dry n-heptane at room temperature in an atmosphere of dry nitrogen. A brown precipitate formed immediately. More n-heptane was immediately added to bring the volume of the mixture up to 100 ml. and it was stoppered to exclude air. After standing 7 days at room temperature in Pyrex glass, this mixture was transferred to a Pyrex glass polymerization vessel with the exclusion of air (nitrogen atmosphere). More dry n-heptane was added to make the volume of the mixture up to 250 ml. Purified dry ethylene was bubbled into the mixture with stirring. There was no temperature rise nor formation of polymer. The polymerization vessel was heated after 34 minutes until a temperature of 80° C. was reached during the next 40 minutes. Still no polymer was formed. The rate of ethylene gas bubbling into the mixture for a total of 1 hour and 18 minutes was 500 to 1,000 ml. per minute. Isopropyl alcohol was added after this time to hydrolyze the catalyst but no polymer could be found.

This experiment shows that storage of a highly active polymerization catalyst for 7 days at room temperature completely deactivates the catalyst.

In a second experiment, 4 ml. of a 0.876 molar solution of triethyl aluminum in dry n-heptane and 4 ml. of a 0.843 molar solution of titanium tetrachloride in dry n-heptane were mixed in 50 ml. of heptane in a 100 ml. graduate, were made up to 100 ml. with heptane, and this catalyst slurry was stored under nitrogen for 15 days at room temperature. After 15 days this slurry was transferred to a 250 ml. separatory funnel, diluted to 250 ml. with dry n-heptane and transferred to a Pyrex glass reaction vessel under a nitrogen blanket. Ethylene (Mathieson C.P.) was bubbled into the reaction mixture. The ethylene absorption rate reached 350 ml./min. in 32 minutes and the temperature increased from 28° to 45.8° C. in 47 minutes. The absorption rate decreased to zero and the temperature dropped to 36.0° C. in 68 minutes. This slight activity could have produced a maximum of 9.8 grams of polyethylene as calculated from the ethylene absorption rates. At this point the catalyst was inactive.

Twenty ml. of a 0.876 molar solution of ethyl aluminum dichloride in dry heptane was diluted to 250 ml. with heptane in a separatory funnel and 50 ml. of this activator solution was added to the reaction mixture. The ethylene absorption rate increased to 250 ml./min. and the temperature increased to 37.0° C. in 12 minutes. The additional 200 ml. of activator solution was added and the reaction mixture heated. The absorption rate increased to 1000 ml./min. in 148 minutes and the temperature increased to 77.2° C. The external heat source was removed when the temperature reached 67.8° C. after 114 minutes. The temperature was maintained at 55°–75° C. for an additional 68 minutes as the ethylene absorption rate decreased to 100 ml./min. At this time the reaction mixture was cooled to room temperature and 100 ml. of isopropanol added to deactivate and solubilize the catalyst. The polymer slurry was filtered. The dry polymer weighed 94.6 grams of which at least 84.8 grams was formed after reactivation of the catalyst with ethyl aluminum dichloride as compared to a maximum of 9.8 grams of polyethylene formed by the original catalyst. This polymer had an intrinsic viscosity of 7.33 which is equivalent to a molecular weight of 570,000.

This experiment shows that ethyl aluminum dichloride is an excellent activator for a catalyst which had been largely deactivated by storage at room temperature for 15 days. It has been shown in Example I that ethyl aluminum dichloride, when reacted with $TiCl_4$ alone, does not yield an active polymerization catalyst.

*Example V*

Four ml. of a 0.843 molar solution of titanium tetrachloride in dry n-heptane and 4 ml. of a 0.876 molar solution of triethyl aluminum (pure) in dry n-heptane were added to 100 ml. of dry n-heptane in a 250 ml. separatory funnel and made up to 250 ml. with heptane at room temperature in an atmosphere of nitrogen. A brown precipitate formed immediately upon addition of the aluminum alkyl to the titanium tetrachloride solution. This slurry was transferred to a Pyrex glass polymerization vessel under a nitrogen blanket, heated to 50° C. for 15 minutes and cooled to 29.2° C., and diluted with 500 ml. of dry n-heptane. Ethylene (Mathieson C.P.) was bubbled into the reaction mixture. The ethylene absorption rate increased to 250 ml./min. in 21 minutes and then decreased to zero in 78 minutes. The temperature reached a maximum of 42.0° C. in 45 minutes and decreased to 38.4° C. in 78 minutes. The total ethylene absorption during this period indicated a maximum formation of 11.8 grams of polyethylene. The catalyst was inactive at this point.

One hundred ml. of an activator solution containing 6 ml. of a 0.876 molar solution of ethyl aluminum dichloride (86%) in 250 ml. of dry n-heptane was added and the reaction temperature raised to 63.8° C. by external heating. The ethylene absorption rate increased to 300 ml./min. and the reaction was maintained at 50°–60° C. for 20 minutes by adding 3 additional 50 ml. portions of the activator solution. Heat was applied to maintain the reaction in this temperature range for an additional 7 hours at which time the reaction ended as indicated by a zero ethylene absorption rate. A total yield of 64.2 grams was obtained, of which at least 52.4 grams was formed after reactivation with ethyl aluminum dichloride compared to a maximum of 11.8 grams formed by the original overheated catalyst. The polyethylene had an intrinsic viscosity of 6.78 equivalent to a molecular weight of 520,000 on the Harris scale.

*Example VI*

In a first experiment, 5 ml. of a 0.843 molar solution of titanium tetrachloride in n-heptane and 5 ml. of a 0.876 molar solution of ethyl aluminum compound (25% triethyl aluminum—75% diethyl aluminum chloride) in n-heptane were added to 100 ml. of dry n-heptane in a dropping funnel in an atmosphere of dry nitrogen. A brown precipitate formed immediately. More dry n-heptane was immediately added to make the total volume of the mixture up to 200 ml. After standing 1 hour, this mixture was added to the Pyrex glass polymerization vessel containing 250 ml. of dry n-heptane protected from air by an atmosphere of dry nitrogen. The mixture was heated to 50° C. with stirring and held there for about 30 minutes. Ethylene (purified and dry) was then passed into the catalyst mixture at 1,500 ml. per minute for about 30 minutes, then at 1,000 ml./min. for 47 minutes, and then at 500 ml./min. for 20 minutes. Plugging of the gas inlet tube occurred at the end of the reaction but ethylene absorption was already down to 100 ml. per minute. A total of 450 ml. additional n-heptane was added during the polymerization. The catalyst was decomposed by adding 50 ml. of isopropanol. The white solid polymer was removed by filtration, washed with isopropanol, and dried in vacuo at 68° C. The dry polymer weighed 79.0 grams. It softened at 129° C., melted at 133°–151° C., and had an intrinsic viscosity of 2.48 $cm.^3 10^2/g.$, corresponding to a molecular weight of about 121,000.

This experiment demonstrates the activity of the $TiCl_4$-ethyl aluminum compound catalyst employed.

In a second experiment, 10 ml. of a 0.843 molar solution of titanium tetrachloride in n-heptane and 10 ml. of a 0.876 molar solution of ethyl aluminum compound (25% triethyl aluminum and 75% diethyl aluminum chloride) in n-heptane were added to 50 ml. of dry n-heptane. A brown precipitate immediately formed. More dry n-heptane was added to make the total volume of the mixture 100 ml. All operations were done in a dry nitrogen atmosphere. After standing 2 hours, the mixture was filtered and the brown solid was reslurried in dry n-heptane and refiltered. After another reslurrying and refiltering, the solid was slurried into a dropping funnel with a total of 250 ml. of dry n-heptane. This was transferred to the Pyrex glass polymerization vessel and stirred while purified dry ethylene was bubbled with the mixture. With 1,000 ml./min. rate of ethylene the temperature of the mixture rose from 26.3° to a maximum of 28.9° C. in 10 minutes. The total absorption of ethylene was no more than 2,000 ml. No more ethylene absorption occurred at room temperature over the next 30 minutes nor at temperatures up to 80° C. over the next 2 hours.

At this point the temperature was back down to 27° C. and 100 ml. of a n-heptane solution containing 10 ml. of a 0.876 molar solution of ethyl aluminum compound (the 25% triethyl aluminum—75% diethyl aluminum chloride) was added. Immediately the rate of ethylene addition had to be increased to 1,500 ml. per minute with complete absorption. The temperature rose from 27.0° to 75.0° C. in 24 minutes at which time the rate was reduced to 1,000 ml. per minute. After another 45 minutes at this rate the ethylene absorption was still 45% but the polymerization was voluntarily terminated. The catalyst was decomposed with isopropanol and the white solid polymer was removed by filtration, washed with isopropanol, and dried in vacuo at 69° C. The dry polymer weighed 67.7 grams. It softened at 158°–182° C., melted only partially from 197°–227° C., and had an intrinsic viscosity of 9.5, corresponding to a molecular weight of about 840,000.

This experiment shows that the separated brown precipitate of an active catalyst is itself rather inactive but may be activated by the addition of alkyl aluminum compound.

*Example VII*

The slurry of filtered brown solid was prepared and placed in the polymerization vessel in the same manner as in the second experiment of Example VI except that it was allowed to stand only 1 hour before filtering. When pure dry ethylene was bubbled in, the temperature rose from 25.9° to 27.1° C. with only a little over 1,000 ml. of gaseous ethylene being absorbed. After 20 minutes of ethylene bubbling in at the rate of 1,000 ml./min. at room temperature and no absorption, dry hydrogen chloride gas was bubbled in for 2.5 minutes at 100 ml. per minute. No ethylene was absorbed due to this treatment.

After continuing the ethylene at 1000 ml./min. for another 16 minutes with no absorption, a solution (250 ml. total n-heptane used here) containing 10 ml. of a 0.876 molar solution of diethyl aluminum chloride was added. In two minutes the entire 1000 ml./min. of ethylene was being absorbed and the temperature rose 30°C. in 8 minutes. The maximum temperature spontaneously achieved was 84° C. which occurred 4.7 hours after the addition of the aluminum compound. Another 250 ml. of dry n-heptane was added during the reaction. Ethylene absorption remained at high efficiency until there was so much polymer that channelling took place with practically no stirring. The catalyst was decomposed with the addition of 50 ml. of isopropanol. The white solid polymer was removed by filtration, washed with isopropanol, and dried in vacuo at 68° C. The dry polymer weighed 240.6 grams. It softened at 129° C., melted at 175°–238° C. and had an intrinsic viscosity of 8.34, corresponding to a molecular weight of about 690,000.

Example VII shows that while HCl is ineffective as an activator of the separated catalyst precipitate, diethyl aluminum chloride may be used for this purpose.

*Example VIII*

Ten ml. of a 0.843 molar solution of titanium tetrachloride in n-heptane and a 0.876 molar solution of ethyl aluminum compound (87% triethyl aluminum and 13% diethyl aluminum bromide) in n-heptane were added to 100 ml. of dry n-heptane in a dropping funnel protected with an atmosphere of dry nitrogen. A brown precipitate immediately formed. More n-heptane was immediately added to make the total volume of the mixture up to 250 ml. After 1 hour at room temperature this mixture was transferred to the Pyrex glass polymerization vessel protected at all times with an atmosphere of dry nitrogen. The stirred mixture was heated to 70° C. and held at this temperature for 15 minutes. It was cooled to 28.0° C. with an ice bath and then purified dry ethylene was introduced into the reaction mixture without cooling. The ethylene rate was 500 ml./min. initially and then 1000 ml./min. after 10 minutes (temperature at 10 minutes was 44.2° C.). The temperature was maintained between 60° and 65° C. by intermittent cooling.

After a total of 54 minutes of ethylene introduction, the temperature was declining and incremental addition of n-heptane solutions of the aluminum compound were made during the rest of the reaction. A total of 250 ml. of n-heptane solution containing 10 ml. of a 0.876 molar solution of ethyl aluminum compound (87% triethyl aluminum—13% diethyl aluminum bromide) was made in 5 equal parts of 54, 66, 73, 90 and 130 minutes after the beginning of ethylene introduction. During this time the temperature was maintained at 60°–65° C. and an additional 350 ml. of n-heptane was added to keep the slurry fluid. The reaction was terminated after 277 minutes at which time ethylene absorption was about 100 ml./min. and temperature was 51.2° C. (No heating was applied throughout the time of ethylene addition.) The catalyst was decomposed by adding 100 ml. of isopropanol. The white solid polymer was removed by filtration, washed with isopropanol, and dried in vacuo at 70° C. The dry polymer weighed 163.5 grams. It softened at 140° C., melted at 151°–230° C., and had an intrinsic viscosity of 7.47 cm.$^3$10$^2$/g., corresponding to about 590,000.

This example shows the low activity of an overheated (15 minutes at 70° C.) catalyst mixture and its activation in accordance with the invention.

*Example IX*

A catalyst mixture was prepared from the same stock solutions of titanium tetrachloride and ethyl aluminum compounds as in Example VIII, using the same volume of dry n-heptane, except that only half (5 ml. of a 0.843 molar solution of TiCl$_4$ and 5 ml. of a 0.876 molar solution of alkyl aluminum) as much of the active ingredients were employed. This mixture was stirred in the polymerization vessel for 15 minutes at 60° C. and cooled to room temperature (27° C.) before introducing ethylene. A solution (250 ml.) of n-heptane containing 5 ml. of a 0.876 molar solution of ethyl aluminum compound (87% triethyl aluminum—13% diethyl aluminum bromide) was added to the catalyst mixture just prior to starting to introduce ethylene. The rate of ethylene addition was between 500 and 1500 ml./min. and the reaction temperature maintained between 55° and 60° C. by intermittent cooling. No external heating was applied. A total of 1,000 ml. of n-heptane was added during the reaction to keep the slurry fluid. The reaction was terminated after 4 hours and 32 minutes at which time ethylene absorption was down to 200 ml./min. and there was so much polymer present that stirring was very inefficient so that a temperature gradient of large magnitude existed in the polymerization vessel. The catalyst was decomposed by the addition of 100 ml. of isopropanol. The white solid polymer was removed by filtration, washed with isopropanol, and dried in vacuo at 70° C. The dry polymer weighed 236.5 grams. It softened at 183° C., partially melted at 227° to 250+° C., and had an intrinsic viscosity of 8.07 cm.$^3$10$^2$/g., corresponding to a molecular weight of about 670,000.

The catalyst deactivated by overheating (15 minutes at 60° C.) was reactivated by the addition of alkyl aluminum compound prior to the polymerization reaction.

*Example X*

A catalyst solution was prepared in the same manner as in Example IX using 5 ml. of a 0.843 molar solution of TiCl$_4$ and 5 ml. of a 0.876 molar solution of ethyl aluminum compound (87% triethyl aluminum—13% diethyl aluminum bromide). The 250 ml. mixture was stirred and heated to 70° C. in the polymerization vessel and held at this temperature for 15 minutes. It was then cooled in an ice bath to 32° C. At that time a 250 ml. n-heptane solution containing 5 ml. of a 0.876 molar solution of ethyl aluminum compound (87% triethyl aluminum—13% diethyl aluminum bromide) was added to the catalyst mixture. This was allowed to stir at room temperature (32°–26° C.) for 52 minutes. During this time the precipitate turned from a red brown flocculent to a more dense black precipitate. Purified dry ethylene was then introduced at 500–1000 ml./min. The temperature rose spontaneously to only 35° C. after 19 minutes and the maximum ethylene absorption was 500 ml./min. Heat was applied to keep the temperature at about 50° C. for about 40 minutes. The total time of ethylene addition was 1 hour and 40 minutes with practically no absorption during the last 40 minutes. The catalyst was decomposed by adding 50 ml. of isopropanol. The polymer was filtered, washed with isopropanol, and dried in vacuo at 70° C. The dry polymer weighed 10.1 grams. It softened at 162° C., its melting point was over 250° C., and the intrinsic viscosity was 7.12 cm.$^3$10$^2$/g., corresponding to about 550,000 molecular weight.

Again the heat-deactivated catalyst was reactivated by the addition of alkyl aluminum compound.

*Example XI*

In a first experiment, 10 ml. of a 0.843 molar solution of titanium tetrachloride in n-heptane and 10 ml. of a 0.876 molar solution of ethyl aluminum compound (87% triethyl aluminum—13% diethyl aluminum bromide) in n-heptane were added to 100 ml. of dry n-heptane. A brown precipitate formed immediately. More n-heptane was added immediately to make the total volume of the mixture up to 100 ml. using an atmosphere of dry nitrogen at all times. It was stored at room temperature for 2 days (51 hours) and then made up to 250 ml. with dry n-heptane and transferred to the Pyrex glass polymerization vessel. Purified dry ethylene was introduced into the stirred mixture at a rate of 1,000 ml. per minute for a total of 1 hour. The temperature rose from 26.0° to 65.6° C. in 18 minutes. Cooling was applied to keep the temperature between 60° and 70° C. There was practically no absorption of ethylene and the temperature had dropped to 49° C. when the catalyst was decomposed by the addition of 50 ml. of isopropanol. The white solid polymer was removed by filtration, washed with isopropanol, and dried in vacuo at 70° C. The dry polymer weighed 36.0 grams. It softened at 135° C., partially melted at 205° to 250° C., and had an intrinsic viscosity of 3.39 cm.$^3$10$^2$/g., corresponding to a molecular weight of about 190,000.

This experiment shows the low activity of a catalyst stored for 2 days.

In a second experiment, the catalyst was prepared in the same manner and with the same reagents and quantities as in the first experiment except that the mixture was stored under dry nitrogen for 7 days instead of 2 days before introducing ethylene for polymerization. When polymerization was attempted, no ethylene was absorbed and no polymer was formed, showing that the catalyst had become completely deactivated during storage. The stirred mixture was heated from room temperature gradually up to 80° C. over a period of an hour with continuous introduction of ethylene at 500–1,000 ml./min.

In a third experiment, the catalyst prepared in the same manner as in the second experiment was again found to have no activity with ethylene at room temperature (28.8° C.) for 15 minutes of introducing the gas at 500 ml./min. Following this, 250 ml. of n-heptane solution containing 10 ml. of a 0.876 molar solution of ethyl aluminum compound (87% triethyl aluminum—13% diethyl aluminum bromide) was added in 50 ml. portions at 15, 21, 27, 41 and 55 minutes after starting ethylene introduction. This catalyst mixture became active enough to form polymer slowly but heat was applied to raise the temperature from 35° to 50° C. to help speed up the absorption of ethylene. After a total of 2 hours and 26 minutes the ethylene flow was stopped and the catalyst was decomposed by adding 50 ml. of isopropanol. The polymer was recovered by filtration, washed with isopropanol, and dried in vacuo at 70° C. The dry polymer weighed 10.2 grams. It softened at 135° C. and partially melted at 151°–240+° C.

This experiment shows some reactivation of the catalyst by addition of alkyl aluminum compound to the total deactivated catalyst composite.

In a fourth experiment, 10 ml. of a 0.843 molar solution of titanium tetrachloride in n-heptane and 10 ml. of a 0.876 molar solution of ethyl aluminum compound (87% triethyl aluminum—13% diethyl aluminum bromide) in n-heptane were added to 50 ml. of dry n-heptane. A brown precipitate formed immediately. More dry n-heptane was immediately added to make the total volume of the mixture 100 ml. All operations were in an atmosphere of dry nitrogen. This mixture was stored for 7 days and then filtered in an atmosphere of dry nitrogen. The brown solid was reslurried in dry n-heptane and refiltered twice. The brown solid was then reslurried in 250 ml. of dry n-heptane and placed in the Pyrex polymerization vessel containing 250 ml. of dry n-heptane in an atmosphere of dry nitrogen. Purified dry ethylene introduced into the stirred mixture with no absorption nor polymer formation even after heating from 26°–52° C. with 500 ml./min. of ethylene flow for 30 minutes.

After cooling to 26° C., 50 ml. of n-heptane solution containing a 0.876 molar solution of ethyl aluminum compound (87% triethyl aluminum—13% diethyl aluminum bromide) was added. Ethylene absorption began rapidly to increase to 90% of the 1000 ml./min. flow rate and the temperature of the stirred mixture rose to 60° C. in 18 minutes. The temperature was maintained between 58° and 64° C. by intermittent cooling with a water bath. The reaction was terminated as the ethylene absorption fell to about 100 ml./min. and the temperature dropped to 46° C. after 3 hours, 20 minutes. The catalyst was decomposed by adding 50 ml. of isopropanol. The polymer was removed by filtration, washed with isopropanol, and dried in vacuo at 70° C. The dry polymer weighed 75.4 grams. It softened at 166+° C., partially melted at 200° to 240+° C., and had an intrinsic viscosity of 9.04 cm.$^3$10$^2$/g., corresponding to a molecular weight of about 780,000.

This experiment shows that addition of the activating alkyl aluminum compound to the separated catalyst precipitate is more effective than addition to the total original catalyst composite.

*Example XII*

Ten ml. of a 0.843 molar solution of titanium tetrachloride in n-heptane and 10 ml. of a 0.876 molar solution of ethyl aluminum compound (87% triethyl aluminum—13% diethyl aluminum bromide) in n-heptane were added to 50 ml. of dry n-heptane. A brown precipitate formed immediately. More dry n-heptane was immediately added to make the total volume of the mixture 100 ml. All operations were in an atmosphere of dry nitrogen. After standing for 1 hour, the mixture was filtered in an atmosphere of dry nitrogen. The brown solid was reslurried in dry n-heptane and refiltered twice. The brown solid was then reslurried in 100 ml. of dry n-heptane and allowed to stand for 7 days (during storage the stopper became loose and some air entered, enough to decolorize from brown to white about 10% of the brown solid in the mixture). This did not affect most of the brown solid nor its activity to any extent as seen below.

After the 7 days of storage, the mixture was made up to 250 ml. with dry n-heptane and transferred to the Pyrex glass polymerization vessel containing 250 ml. of dry n-heptane protected with an atmosphere of dry nitrogen. Purified dry ethylene introduced into the stirred mixture failed to react at 27° C. for a period of 30 minutes. This shows the inactivity of the brown solid without the alkyl aluminum compound in the mixture as expected from the experiments above.

A 250 ml. n-heptane solution containing 10 ml. of a 0.876 molar solution of ethyl aluminum compound (87% triethyl aluminum—13% diethyl aluminum bromide) was then added in 50 ml. portions, one at this time and the others 36, 68, 91 and 100 minutes later. Ethylene absorption was rapid after adding the aluminum compound and intermittent cooling was applied to keep the temperature between 55° and 60° C. Ethylene flow rate was maintained at 500 to 1,000 ml. per minute for 3 hours and 58 minutes after the first portion of the aluminum compound was added. About midway through the polymerization, 250 ml. of dry n-heptane was added to help keep the slurry fluid. The polymerization was voluntarily terminated even though there was still 300 ml. of ethylene being absorbed per minute and the temperature was being sustained at 51° C. by heat of reaction. The catalyst was decomposed by adding 50 ml. of isopropanol. The white solid polymer was removed by filtration, washed with isopropanol, and dried in vacuo at 70° C. The dry polymer weighed 92.3 grams. It softened at 140° C., partially melted at 169°–240+° C., and had an intrinsic viscosity of 9.80 cm.$^3$10$^2$/g., corresponding to a molecular weight of about 870,000.

This example demonstrates that the separated precipitate from the original catalyst composite is stable for long periods of time and may thereafter be converted into an active catalyst in accordance with the present invention.

*Example XIII*

In a first experiment, 11.1 ml. of a 10% by weight solution of AlEtCl$_2$ was added to 50 ml. of dry n-heptane in a 250 ml. separatory funnel. Then 5 ml. of a 0.843 molar solution of TiCl$_4$ in heptane were added. The mixture was made up to 250 ml. with dry n-heptane and placed in a 2-liter glass reactor vessel. The mixture was a light yellow clear solution. Heat was applied to bring the mixture to 50° C. and it was maintained at 50° C. for 15 minutes. No change in the reaction mixture was observed. The mixture was cooled to 27.0° C. and ethylene was bubbled into the reactor. No ethylene absorption was noted. A few small droplets of yellow oil deposited on the glass surface of the reactor. After 30 minutes heat was applied and the temperature increased to 81.2° C. for 30 minutes. A few small droplets of yellow oil deposited on the glass surface of the reactor. No ethylene absorption was noted. The mixture was cooled to 40.2° C. and reheated to 83.0° C. No ethylene absorption was observed. The mixture was cooled to 42.5° C. and 50 ml. of isopropanol were added. The solution became clear and white. The few small yellow droplets disappeared. A large excess of isopropanol was added, but no evidence of polymer was noted.

This experiment again shows that ethyl aluminum dichloride does not react with TiCl$_4$ alone to form an active polymerization catalyst.

In a second experiment, 1.5 grams of Na as a stabilized 50% sodium dispersion in heptane containing sodium particles of 1 to 30 diameter averaging a particle size of 15, was placed in 250 ml. of n-heptane in a separatory funnel in a nitrogen dry box. Similarly 20 ml. of a 0.843 molar solution of TiCl$_4$ in n-heptane and 20 ml. of a 0.876 molar solution of EtAlCl$_2$ were each separately diluted to 250 ml. with n-heptane in separatory funnels.

The diluted sodium dispersion and the titanium tetrachloride solution were placed in a 2-liter glass reactor. The mixture was heated to 70° C. and maintained at that temperature for 15 minutes with stirring. The light gray slurry darkened to a medium brown color. The mixture was cooled to 30° C. and then ethylene was bubbled into the reactor. No change in temperature or absorption of ethylene was observed for 15 minutes. Then 50 ml. of the activator solution of ethyl aluminum dichloride was added. No temperature change or ethylene absorption was observed. The remaining 200 ml. of activator solution was added with no evidence of polymerization over a period of 3 minutes. The reaction mixture was then heated. At 56.2° C. ethylene absorption was noted as 250 ml./min. and polymer particles began to appear in the slurry. The mixture was heated to 64.0° C. in 9 minutes and the ethylene absorption rate increased to 750 ml./min. The external heat source was removed. The temperature increased spontaneously to 77.2° C. and the ethylene absorption rate increased to 1250 ml./min. The ethylene feed stream was then diluted with 250 ml./min. of N$_2$ and the ethylene absorption rate was maintained at 1000 ml./min. for 30 minutes. The temperature was maintained between 60°–70° C. by cooling with tap water. The ethylene absorption rate gradually decreased during the next 3 hours and near the end of the reaction heat was applied to maintain the temperature between 60°–70° C. The reaction mixture was cooled to 30° C. and 100 ml. of isopropanol was added. The slurry turned white. The polymer was filtered and dried in vacuo. The solid polymer weighed 104.0 grams and 4.1 grams of soluble polymer was recovered from the filtrate.

This experiment shows that a catalyst prepared from sodium and titanium tetrachloride may be strongly activated by the addition of ethyl aluminum dichloride, which in itself does not form an active polymerization catalyst when reacted with TiCl$_4$.

The above examples also have shown that the polymers obtained by this invention are of much higher molecular weights than are ordinarily obtained with catalysts made by mixing solutions of titanium tetrachloride and alkyl aluminum compounds. This is particularly true where the brown solid reaction product of titanium tetrachloride and trialkyl aluminum or dialkyl aluminum halide is separated by filtration before it is treated with the alkyl aluminum compound for improved catalytic activity.

The invention is not limited to the specific figures of the foregoing examples. The relative proportions of the materials used and the reaction conditions may be varied within the limits indicated in the specification to obtain products of varying characteristics.

What is claimed is:

1. The method of preparing catalysts for olefin polymerization which comprises mixing a solution of an alkyl aluminum compound selected from the group consisting of triethyl aluminum and diethyl aluminum halide with a solution of titanium tetrachloride to form a slurry of a precipitate containing a reduced modification of titanium tetrachloride and mixing said precipitate, whose polymerization activity is reduced by storage prior to contact with olefins, with an alkyl aluminum compound having a relatively low reducing activity, differing from said alkyl aluminum compound previously utilized and selected from the group consisting of ethyl aluminum dihalides, methyl aluminum dihalides, and dimethyl aluminum halides, to form a polymerization catalyst of increased activity.

2. The method of preparing catalysts for olefin polymerization which comprises mixing a solution of an alkyl aluminum compound selected from the group consisting of triethyl aluminum and diethyl aluminum halide with a solution of titanium tetrachloride to form a slurry of a precipitate containing a reduced modification of titanium tetrachloride and mixing said precipitate, whose polymerization activity is reduced by heating prior to contact with olefins, with an alkyl aluminum compound having a relatively low reducing activity, differing from said alkyl aluminum compound previously utilized and selected from the group consisting of ethyl aluminum dihalides, methyl aluminum dihalides, and dimethyl aluminum halides, to form a polymerization catalyst of increased activity.

3. The method of preparing catalysts for olefin polymerization which comprises mixing a solution of an alkyl aluminum compound selected from the group consisting of triethyl aluminum and diethyl aluminum halide with a solution of titanium tetrachloride to form a slurry of a precipitate containing a reduced modification of titanium tetrachloride, separating the precipitate from the slurry, storing it and mixing said precipitate with an alkyl aluminum compound having a relatively low reducing activity, differing from said alkyl aluminum compound previously utilized and selected from the group consisting of ethyl aluminum dihalides, methyl aluminum dihalides, and dimethyl aluminum halides, to form a polymerization catalyst of increased activity.

References Cited in the file of this patent

UNITED STATES PATENTS

| | | |
|---|---|---|
| 2,388,178 | Peterson | Oct. 30, 1945 |
| 2,396,920 | Larson | Mar. 19, 1946 |
| 2,439,765 | Walker | Apr. 13, 1948 |
| 2,600,654 | Jacobson | June 17, 1952 |
| 2,824,089 | Peters et al. | Feb. 18, 1958 |
| 2,827,446 | Breslow | Mar. 18, 1958 |

FOREIGN PATENTS

| | | |
|---|---|---|
| 789,781 | Great Britain | Apr. 17, 1955 |
| 526,101 | Italy | May 14, 1955 |
| 534,792 | Belgium | Jan. 31, 1955 |

Notice of Adverse Decision in Interference

In Interference No. 93,636 involving Patent No. 2,943,063, L. T. Eby, C. W. Seelbach, D. L. Cottle and R. M. Thomas, CATALYSTS FOR POLYMERIZATION OF OLEFINS, final judgment adverse to the patentees was rendered Dec. 6, 1965, as to claims 1, 2 and 3.

[*Official Gazette May 17, 1966.*]